Figures 1, 2:
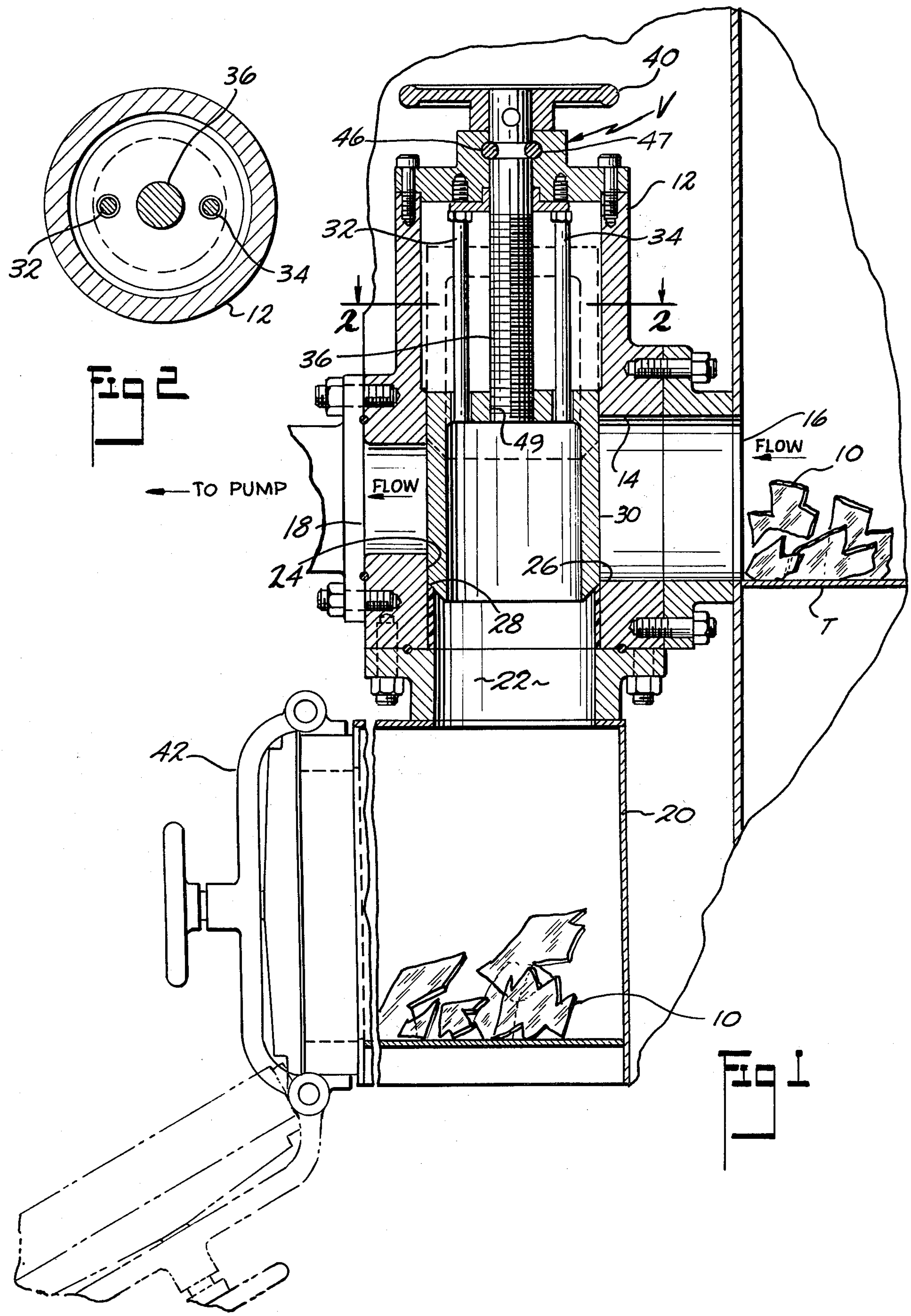

United States Patent [19]

Vamvakas

[11] 4,406,304

[45] Sep. 27, 1983

[54] PISTON TYPE VALVE

[75] Inventor: Michael Vamvakas, 2739 Country Club Blvd., Rocky River, Ohio 44116

[73] Assignee: Michael Vamvakas, Rocky River, Ohio

[21] Appl. No.: 290,430

[22] Filed: Aug. 6, 1981

[51] Int. Cl.[3] .............................................. B01D 21/02

[52] U.S. Cl. .................................... 137/544; 137/546; 137/874; 251/266; 251/324; 210/532.1

[58] Field of Search ............... 137/546, 544, 572, 872, 137/874, 886; 251/205, 266, 324; 210/532.1, 533

[56] References Cited

U.S. PATENT DOCUMENTS

| | | | |
|---|---|---|---|
| 1,583 | 5/1840 | Robertson | 137/546 |
| 999,239 | 8/1911 | Mason | 137/546 |
| 1,004,845 | 10/1911 | Böhme | 251/205 |
| 1,805,106 | 5/1931 | Robinson | 137/546 |
| 2,596,817 | 5/1952 | McGovney | 251/205 |
| 3,586,042 | 6/1971 | Grenier | 137/546 |

*Primary Examiner*—Alan Cohan
*Assistant Examiner*—John A. Rivell
*Attorney, Agent, or Firm*—Baldwin, Egan, Walling & Fetzer

[57] ABSTRACT

A piston type valve including a valve body having a horizontally disposed fluid flow passageway with an inlet at one end of the passageway and an outlet at the other end of the passageway. A valve piston is mounted in the body for selective vertical movement to and away from the passageway inlet and outlet to selectively close and open the passageway and control fluid flow therethrough. A debris holding tank is disposed on the valve body below the fluid flow passageway and is in fluid flow communication therewith. The passageway outlet has its bottom portion disposed higher than the bottom portion of the inlet whereby debris contained in the fluid flow through the passageway strikes the outlet bottom portion and falls into the tank. The valve piston is cylindrical and is mounted on vertical guide rods to guide the piston in its vertical movement and to prevent it from turning in a horizontal plane.

10 Claims, 2 Drawing Figures

40
V
47
46
12
32
34
2
2
36
16
FLOW
10
49
14
← TO PUMP
FLOW
30
18
24
26
28
T
22
42
20
10

36
32
34
12

40
V
46
47
12
32
34
2
2
36
49
16
FLOW
10
TO PUMP
FLOW
14
30
18
24
26
28
T
22
42
20
10

PISTON TYPE VALVE

BACKGROUND OF THE INVENTION

This invention relates to cylindrical piston type valves and more particularly to a cylindrical piston valve constructed to remove debris from the fluid flow through the valve and deposit it in a debris holding tank attached to the bottom of the valve.

In many fluid flow systems the fluid contains various quantities of debris and solid particles which must be removed from the fluid to prevent destruction of the system components (particularly the valves) and to provide debris-free fluid for subsequent applications requiring clean fluids.

For example, in bottle washing machinery, broken glass inevitably accumulates in the apparatus, particularly in the washing tanks. Various attempts have been made to remove the broken glass, but have failed to do so in a quick and simple manner. Prior valves designed to remove the glass pieces have not been effective in removing all of the glass because of their inability to catch all of the glass particles from a fast moving fluid flow through the valve.

Therefore, it is an object of the invention to provide a valve that removes all of the debris and solid particles contained in the fluid flowing through the valve.

A further object of the invention is to provide a valve of the above type that is simple in construction, inexpensive to manufacture, and highly effective in operation.

BRIEF DESCRIPTION OF THE INVENTION

Briefly, the foregoing objects are accomplished by the provision of a piston type valve including a valve body having a horizontally disposed fluid flow passageway with an inlet at one end of the passageway and an outlet at the other end of the passageway. A debris holding tank is disposed on the valve body below the passageway and is in fluid flow communication therewith. The valve body has a conduit connecting the tank with the passageway. The passageway outlet has its bottom portion disposed higher than the bottom portion of the passageway inlet whereby debris contained in the fluid flow through the passageway strikes the outlet bottom portion and falls through the conduit and into the tank. A cylindrical valve piston is operatively mounted in the valve body for selective vertical movement to and away from the inlet and outlet and to and away from the conduit to selectively close and open the passageway and the conduit and control fluid flow through the passageway and the conduit. The cylindrical valve piston is mounted on two vertical guide rods to guide the piston in its vertical movement and to prevent it from turning in a horizontal plane. The piston has a stem extending out the top of the valve body with a handle secured to the outer end of the stem enabling manual turning of the piston to control fluid flow through the fluid flow passageway and through the conduit to the tank. The tank has a door thereon enabling removal of debris from the tank when the valve is closed.

Other objects and advantages of the invention will be apparent from the following description taken in conjunction with the drawings wherein:

FIG. 1 is a front elevational sectional view of a piston type valve constructed in accordance with the invention; and FIG. 2 is a view taken along the line 2—2 of FIG. 1.

In the drawings, like numbers and letters are used to identify like and similar parts throughout the several views.

Referring to FIG. 1, there is illustrated a piston type valve V, constructed in accordance with the invention, and shown secured to a washer tank T of a bottle washing machine (not shown). A particular problem in such bottle washer tanks is the constant accumulation of pieces of broken glass 10 which are deposited in the bottom of the tank. When the tank T is emptied by opening the valve V, pieces of glass invariably pass through the valve in the fluid flow therethrough, often causing damage to the valve and to the pump (not shown) which draws water through the valve. Thus, it is imperative that the glass particles be removed as soon as they leave the tank and as effected by the piston type valve V of the invention, now to be explained.

The valve V includes a valve body 12 having a horizontally disposed fluid flow passageway 14 with an inlet 16 at one end of the passageway and an outlet 18 at the other end of the passageway. A glass particle or debris holding tank 20 is disposed on the valve body 12 below the passageway 14 and is in fluid flow communication therewith via the conduit 22, which connects the tank 20 with the passageway 14.

A feature of the invention includes means for intercepting debris such as the outlet 18 having its bottom portion 24 disposed higher than the bottom portion 26 of the inlet 14 whereby debris or broken glass 10 contained in the fluid flow through the passageway 14 strikes the outlet bottom portion 24 and falls through the conduit 22 and into the tank 20.

The valve V is operated by a cylindrical valve piston 30 operatively mounted in the body 12 in the usual manner for selective vertical movement to and away from the inlet 16 and outlet 18 and to and away from the conduit 22 to seat on the valve seat 28 and selectively close and open the passageway 14 and the conduit 22 and control fluid flow through the passageway 14 and the conduit 22, as shown in FIGS. 1 and 2.

The cylindrical valve piston 30 is mounted for vertical displacement on two vertical guide rods 32 and 34 which guide the piston in its vertical movement and prevent it from turning in a horizontal plane. The piston 30 has a screw 36 extending out the top of the valve body 12 with a handle 40 secured to the outer end of the screw enabling vertical movement of the piston in the usual manner to control fluid flow through the passageway 14 and through the conduit 22.

More specifically, the screw 36 is mounted in the body 12 by the pins 46, 47 enabling horizontal turning of the screw (but no vertical movement thereof), with the lower end of the screw being threaded to fit into the piston threaded aperture 49 so that such piston 30 may be raised and lowered by horizontally turning the screw handle 40.

The tank 20 has a door 42 thereon enabling removal of debris 10 from the tank 20 when the valve V is closed.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A piston type valve comprising, a valve body having a horizontally disposed fluid flow passageway with an inlet at one end of the passageway and an outlet at the other end of the passageway with said outlet being in horizontal alignment with said inlet, a valve piston operatively mounted in said body for selective vertical movement to and away from said inlet and outlet to selectively close and open the passageway and control fluid flow therethrough, a debris holding tank disposed on said valve body below said passageway and in fluid flow communication therewith, and means disposed in said passageway at the outlet thereof for intercepting debris in the fluid flow and deflecting it into the tank.

2. The structure of claim 1 wherein said means comprises said outlet having its bottom portion disposed higher than the bottom portion of the inlet whereby debris contained in the fluid flow through the passageway strikes the outlet bottom portion and falls into the tank.

3. A piston type valve comprising, a valve body having a horizontally disposed fluid flow passageway with an inlet at one end of the passageway and an outlet at the other end of the passageway with said outlet being in horizontal alignment with said inlet, a valve piston operatively mounted in said body for selective vertical movement to and away from said inlet and outlet to selectively close and open the passageway and control fluid flow therethrough, and a debris holding tank disposed on said valve body below said passageway, said valve body having a conduit connecting said tank with said passageway, said outlet having its bottom portion disposed higher than the bottom portion of the inlet whereby debris contained in the fluid flow through the passageway strikes the outlet bottom portion and falls into the tank.

4. The structure of claim 3 wherein said valve piston is cylindrical.

5. The structure of claim 4 wherein said cylindrical valve piston is mounted on a plurality of vertical guide rods to guide the piston in its vertical movement and to prevent it from turning in a horizontal plane.

6. The structure of claim 5 wherein there are two guide rods to guide the piston.

7. A piston type valve comprising, a valve body having a horizontally disposed fluid flow passageway with an outlet at one end of the passageway and an outlet at the other end of the passageway with said outlet being in horizontal alignment with said inlet, a debris holding tank disposed on said valve body below said passageway and in fluid flow communication therewith, said valve body having a conduit connecting said tank with said passageway, said outlet having its bottom portion disposed higher than the bottom portion of the inlet whereby debris contained in the fluid flow through the passageway strikes the outlet bottom portion and falls through the conduit and into the tank, and a valve piston operatively mounted in said body for selective vertical movement to and away from said inlet and outlet and to and away from said conduit to selectively close and open the passageway and the conduit and control fluid flow through the passageway and the conduit.

8. The structure of claim 7 wherein said piston has a stem extending out the top of said valve body with a handle secured to the outer end of the stem enabling manual turning of the piston to control fluid flow through said passageway and through said conduit.

9. The structure of claim 7 wherein said tank has a door thereon enabling removal of debris from the tank when the valve is closed.

10. A piston type valve comprising, a valve body having a horizontally disposed fluid flow passageway with an inlet at one end of the passageway and an outlet at the other end of the passageway with said outlet being in horizontal alignment with said inlet, a debris holding tank disposed on said valve body below said passageway and in fluid flow communication therewith, said valve body having a conduit connecting said tank with said passageway, said outlet having its bottom portion disposed higher than the bottom portion of the inlet whereby debris contained in the fluid flow through the passageway strikes the outlet bottom portion and falls through the conduit and into the tank, and a cylindrical valve piston operatively mounted in said body for selective vertical movement to and away from said inlet and outlet and to and away from said conduit to selectively close and open the passageway and the conduit and control fluid flow through the passageway and the conduit, said cylindrical valve piston being mounted on two vertical guide rods to guide the piston in its vertical movement and to prevent it from turning in a horizontal plane, said piston having a screw extending out the top of said valve body with a handle secured to the outer end of the screw enabling manual turning of the piston to control fluid flow through said passageway and through said conduit, said tank having a door thereon enabling removal of debris from the tank when the valve is closed.

* * * * *